US008873451B2

(12) United States Patent
Al et al.

(10) Patent No.: US 8,873,451 B2
(45) Date of Patent: Oct. 28, 2014

(54) RESOURCE ALLOCATION METHOD FOR DYNAMIC MULTIPLEXING OF MULTIMEDIA BROADCAST MULTICAST SERVICE

(75) Inventors: Jianxun Al, Shenzhen (CN); Zijiang Ma, Shenzhen (CN); Lei Mao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 133 days.

(21) Appl. No.: 13/378,826

(22) PCT Filed: Dec. 31, 2009

(86) PCT No.: PCT/CN2009/076335
§ 371 (c)(1),
(2), (4) Date: Dec. 16, 2011

(87) PCT Pub. No.: WO2010/145185
PCT Pub. Date: Dec. 23, 2010

(65) Prior Publication Data
US 2012/0099509 A1 Apr. 26, 2012

(30) Foreign Application Priority Data

Jun. 19, 2009 (CN) .......................... 2009 1 0150616

(51) Int. Cl.
| | |
|---|---|
| *H04H 20/71* | (2008.01) |
| *H04W 72/00* | (2009.01) |
| *H04W 72/04* | (2009.01) |
| *H04W 24/02* | (2009.01) |
| *H04L 1/00* | (2006.01) |
| *H04W 4/06* | (2009.01) |

(52) U.S. Cl.
CPC ................ *H04L 1/007* (2013.01); *H04W 72/04* (2013.01); *H04W 72/005* (2013.01); *H04W 24/02* (2013.01); *H04L 2001/0093* (2013.01); *H04W 4/06* (2013.01)
USPC ........... 370/312; 370/342; 375/260; 375/219; 375/267; 375/295

(58) Field of Classification Search
CPC .......... H04L 1/007; H04L 2001/0093; H04W 24/02; H04W 4/06; H04W 72/005; H04W 72/04

USPC .......... 370/312, 342; 375/260, 219, 267, 295
See application file for complete search history.

(56) References Cited

U.S. PATENT DOCUMENTS

| | | | |
|---|---|---|---|
| 2006/0153227 | A1 | 7/2006 | Hwang et al. |
| 2009/0041779 | A1 | 2/2009 | Mitts et al. |

(Continued)

FOREIGN PATENT DOCUMENTS

| | | | |
|---|---|---|---|
| CN | 1625256 A | | 6/2005 |
| CN | 1625256 A | * | 6/2005 |

(Continued)

OTHER PUBLICATIONS

International Search Report (in Chinese with English translation) for PCT/CN2009/076335, mailed Apr. 8, 2010; ISA/CN.

(Continued)

*Primary Examiner* — Khaled Kassim
(74) *Attorney, Agent, or Firm* — Harness, Dickey & Pierce, PLC

(57) ABSTRACT

A resource allocation method for dynamic multiplexing of Multimedia Broadcast Multicast Service (MBMS) can be used to improve resource utilization efficiency when multimedia multicast services share a channel. A network side device configures a Modulation and Coding Scheme (MCS) for said logical channels or the Multicast/Broadcast over Single Frequency Network (MBSFN) subframes bearing said logical channels according to the transmission requirements of logical channels, and implements modulation and coding processing for the data of Physical Multicast Channel (PMCH) borne by MBSFN subframes bearing said logical channels by using said MCS. The network side device can employ different modulation and coding in the physical layer according to different Quality of Service (QoS) requirements of different logical channels of MBMS services, thereby achieving the purpose of improving resource utilization efficiency and satisfying different service requirements.

4 Claims, 2 Drawing Sheets

(56) References Cited

U.S. PATENT DOCUMENTS

| | | | |
|---|---|---|---|
| 2010/0067512 A1* | 3/2010 | Nam et al. | 370/342 |
| 2010/0128646 A1* | 5/2010 | Gao | 370/312 |
| 2010/0128650 A1* | 5/2010 | Morimoto et al. | 370/312 |
| 2010/0142453 A1* | 6/2010 | Harada et al. | 370/329 |
| 2010/0322133 A1* | 12/2010 | Kuo | 370/312 |
| 2010/0323737 A1* | 12/2010 | Koo et al. | 455/509 |
| 2011/0034177 A1* | 2/2011 | Oh et al. | 455/450 |
| 2011/0051825 A1* | 3/2011 | Tao et al. | 375/260 |
| 2012/0044850 A1* | 2/2012 | Wang | 370/312 |

FOREIGN PATENT DOCUMENTS

| | | |
|---|---|---|
| CN | 101133613 A | 2/2008 |
| CN | 101340609 A | 1/2009 |
| CN | 101399763 A | 4/2009 |
| EP | 1973253 A1 | 9/2008 |
| KR | 0030317 A | 3/2007 |
| KR | 0033126 A | 4/2009 |
| WO | WO-2008/118064 A2 | 10/2008 |

OTHER PUBLICATIONS

MCCH Content for eMBMS Rel-9.

Multiplexing of MBSFN subframes.

* cited by examiner

RESOURCE ALLOCATION METHOD FOR DYNAMIC MULTIPLEXING OF MULTIMEDIA BROADCAST MULTICAST SERVICE

CROSS-REFERENCE TO RELATED APPLICATIONS

This application is a 371 U.S. National Stage of International Application No. PCT/CN2009/076335, filed Dec. 31, 2009, and claims priority to Chinese patent application No. 200910150616.6 filed Jun. 29, 2009, the disclosures of which are herein incorporated by reference in their entirety.

TECHNICAL FIELD

The present invention relates to a Long Term Evolution (LTE) system, and especially, to a resource allocation method for dynamic multiplexing of MBMS (Multimedia Broadcast Multicast Service).

BACKGROUND OF THE RELATED ART

With the rapid development of the Internet and the popularization of the mobile phone with the large screen and multiple functions, a large quantity of mobile data multimedia services and various broad bandwidth multimedia services occur, such as the video conference, television broadcast, video on demand, advertisement, online education, and interactive game and so on, which not only satisfies the continuously increased service demand of the mobile user, but also brings new service increasing points for mobile operators at the same time. These mobile data multimedia services need that a plurality of users are able to receive the same data at the same time, and comparing with the common data service, these mobile data multimedia services have features of large data quantity, long duration, and sensitive time delay and so on.

In order to effectively utilize the mobile network resources, the 3rd Generation Partnership Project (3GPP) proposes the Multimedia Broadcast Multicast Service (MBMS), and this service is a technique of transmitting data from one data source to a plurality of destinations, which implements to share the network (including the core network and the access network) resources, and improves the utilization ratio of the network resources (especially the air interface resources). The MBMS defined by the 3GPP is not only able to implement the pure text and low speed message classified multicast and broadcast, but also able to implement the multicast and broadcast of the high speed multimedia service, and provide various rich video, audio and multimedia services, which undoubtedly complies with the trend of the development of the future mobile data, and provides a better service prospect for the development of the LTE.

In the LTE, the MBMS service can adopt a way of the multicast mode, which is called as the Multicast/Broadcast over Single Frequency Network (MBSFN) sending mode, and the MBMS service sent by adopting the multicast mode is also called as the MBSFN service, which is able to adopt the same modulation and coding format in a plurality of cells, and adopt the same physical resources to send the same content, and the features of the MBMS cell transmission are as follows: 1) synchronization transmission in the MBSFN area; 2) the MBMS transmission combination of multiple cells is supported; 3) the Multicast Traffic Channel (MTCH) and the Multicast Control Channel (MCCH) are mapped into the Multicast Channel (MCH) in the point to multipoint (p-T-m) mode; 4) the MBSFN synchronization area, MBSFN area, MBSFN transmission, advertisement, and reserved cell are all maintained in the semi-static configuration by operations. Thus, User Equipment (UE) of a plurality of cells can receive a plurality of MBMS data with the same content and carry out the Single Frequent Network (SFN) combination, thereby being able to improve the gain of the receiving signal. A plurality of cells adopting the same physical resources and sending the same MBMS service in the MBSFN sending mode composes one MBSFN area. In the practical LTE networking, one MBSFN area has a plurality MBSFN services, and all the MBSFN services belonging to one MBSFN area are called as one MBSFN service group, and that is to say one MBSFN service group only belonging to one MBSFN area. One MBSFN area comprises a plurality of cells, and each cell is configured with one completely same MBSFN service group. The data channel MTCH of a plurality of MBSFN services with the same MBSFN area and the control channel MCCH of the MBSFN services can be multiplexed to one Multicast Channel (MCH). The MCCH and a plurality of MTCHs of the same MBSFN area namely a plurality of logic channels can be mapped into the same one transmission channel MCH; the transmission channel MCH is mapped to Physical Multicast Channel (PMCH), and one PMCH occupies part or all of one subframe in the frequency domain, that is to say, one MBSFN subframe can multiplex a plurality of PMCHs by frequency division, and preferably, the whole frequency domain of one MBSFN subframe can only be allocated to one PMCH.

As shown in FIG. 1, in the LTE system, MCH is a transmission channel, which is characterized by the transmission of point to multipoint, and the corresponding physical resources are multicast resources allocated by the system for the transmission of MBMS services (MTCH), and one MCH is borne by some multicast resources which include several MBSFN frames and MBSFN subframes. The configuration of the multicast resources include a wireless frame allocation mode and a wireless subframe allocation model, and taking subframe as a unit, the multicast resources of each MBSFN area can be divided into multiple groups according to certain patterns, and each group or multiple groups can constitute one MCH. The pattern used to constitute each MCH is called MSAP (MBSFN subframe configuration pattern) of the MCH, and a set of MSAP describes the physical resource of one MCH channel. Each cell can have one or more MCHs, and each MCH only corresponds to a set of MSAP and belongs to one MBSFN area uniquely, but each MBSFN area can have one or more MCHs, and the configuration method of multicast resources configured by each MCH is to configure a set of MSAP for each MCH.

As shown in FIG. 2, in order to improve the transmission efficiency of MTCH, multiple MTCHs borne by each MCH can adopt a dynamic scheduling method, which can multiplex two or more than two MTCHs in the same MBSFN subframe and occupy part of resources of the subframe. In the existing public technologies, MSAP occasion is introduced into the concept of MSAP at the same time, which indicates all multicast resources included in one MCH corresponding to a certain MSAP in one period of time. Multiple MTCHs and dynamic scheduling information are sent in one MSAP occasion, also including MCCH, and dynamic scheduling information can be borne in the MAC control element, or borne in a separate logical channel MSCH (Multicast scheduling channel), and the time span of one MSAP occasion is a scheduling period, also known as a dynamic scheduling period. One MCH allocates one or more MBSFN subframes in one or more MBSFN frames through MSAP, wherein subframes sent in multicast mode are called MBSFN subframes, and the frames which contain MBSFN subframes are called MBSFN frames.

In the invention, each MSAP occasion configured by one MCH bears dynamic scheduling information which is referred to as scheduling information for short, carrying mapping information from MTCH to auxiliary MBSFN subframe, and the mapping information relies on the relation of serial number and index of MBSFN subframe in one scheduling period to be determined, and UE can know which MBSFN subframes each MTCH is allocated to by reading the scheduling information, and UE reads its interested MTCH in the corresponding MBSFN subframes but ignores the MBSFN subframes which it is not required to read, therefore improving MBMS service receiving efficiency of UE and saving power consumption of UE. Said MBSFN subframe number is determined as follows: all MBSFN subframe allocated by one MCH in one scheduling period are arranged in order and numbered in sequence. For example, the total number of MBSFN subframes allocated by MCH channel in one period is 100, thus the subframe number is from 0 to 99, or from 1 to 100.

In the existing LTE technology, multiple transmission channels multiplex a MCH channel as follows: one subframe corresponds to one Transmission Time Interval (TTI), and one or more Transport Blocks (TB) can be sent in one TTI, and each TB corresponds to one Media Access Control Protocol Data Unit (MAC PDU). A MAC PDU contains a plurality of Media Access Control Service Data Units (MAC SDU), and these MAC SDUs can be from different logical channels, and in the invention, possible logical channels include MTCH, MCCH, MSCH, etc. The data from different logical channels are concatenated together to be sent in the physical channels. In order to distinguish the MAC SDU from different logical channels, MAC PDU carries the identification information, which includes specifically an identification of logical channel, position information of data block of the logical channel in the MAC PDU and so on, for the receiving end distinguishing data blocks from different logical channels.

For dynamic multiplexing of MBMS services, in one scheduling period, one MTCH or the continuous data transmission of one MBMS service, that is, the data of one service continuously occupies the MBSFN subframe resources of the MCH channel, until service data of the service which needs to be sent in the scheduling period has been transmitted completely. Data of different services can be sent in the same MBSFN subframe. That is, service data from different services can be concatenated together to be sent in the same MAC PDU. The above service sending sequence can be notified to the receiving end through MCCH channel or other signaling.

In the LTE system, transmission channel generates a transmission block which is sent to the physical channel, and the physical channel performs physical channel processing for the transmission block including coding, and the coding mode includes Turbo code or convolutional code, and coding processing also includes puncturing data and interleaving processing, and physical channel processing also includes sending modulated data, which has been processed by coding and so on, to the wireless interface, and the modulation can be QPSK, or 8PSK, or 16QAM, or 32QAM, etc. Different modulation and coding affect the bandwidth and quality of channel, for example, with a relative high coding rate and a relative low redundant data, more service data can be transmitted, but the coding gain is reduced and the channel bit error rate is relatively increased, and for another example, QPSK has a smaller bearing capacity for service data compared with 16QAM, but it has a lower requirement of the channel environment and its channel bit error rate is smaller. The concept of MCS is defined in the LTE system, and the so-called MCS refers to modulation and coding scheme, and a set of MCS includes modulation and coding mode, rate and other parameters.

According to different MBMS service types, different services have different QoS requirements, for example, multimedia real-time service, such as voice and video, requires a lower channel bit error rate to enhance user's experience of receiving and watching, and in general, the channel bit error rate of this kind of service shall be required to be 1%. Text service or download service has a higher requirement for bandwidth but a relative lower requirement for channel bit error rate, and the channel bit error rate of this kind of service is required to be 10%, and MCCH and MSCH have a higher requirement for channel bit error rate, when logical channel messages of this kind of controlling signaling are sent at wireless interface. When the services have different requirements for channel bit error rate and logical channel of control signaling is multiplexing to the same transmission channel and is mapped to the same physical channel, it is a problem to be solved in the LTE system on how to employ different channel modulation and coding schemes for different services to improve utilization efficiency of wireless resources and satisfy transmission requirements of different services and control signaling.

SUMMARY OF THE INVENTION

The technical problem to be solved by the present invention is to provide a resource allocation method for dynamic multiplexing of Multimedia Broadcast Multicast Service (MBMS), to improve resource utilization efficiency when multimedia multicast services share a channel.

In order to solve the above technical problem, the invention provides a resource allocation method for dynamic multiplexing of Multimedia Broadcast Multicast Service, which comprises:

a network side device configuring a Modulation and Coding Scheme (MCS) respectively for one or more Multicast/Broadcast over Single Frequency Network (MBSFN) subframes, implementing modulation and coding processing for data of Physical Multicast Channel (PMCH) borne by said MBSFN subframes according to said MCS.

Furthermore, the above resource allocation method also includes following characteristics:

said network side device configures MCS for said one or more MBSFN subframes, using one of following ways specifically:

the network side device configures MCS respectively for one or more MBSFN subframes in MBSFN subframe allocation pattern (MSAP) occasion; or the network side device segments one or more MBSFN subframes in the MSAP occasion, wherein, each segment contains one or more MBSFN subframes; the network side device configures MCS for each segment of MBSFN subframe respectively; or the network side device configures MCS respectively for said MBSFN subframe corresponding to each of MSAP configurations which constitute the MSAP occasion.

Furthermore, the above resource allocation method also includes the following characteristics:

when performing service scheduling, said network side device schedules logical channel data with same Quality of Service (QoS) requirement to continuous MBSFN subframes.

Furthermore, the above resource allocation method also includes the following characteristics:

after configuring the MCS, said network side device informs User Equipment (UE) of the MCS employed by PMCH borne by one or more MBSFN subframes in one period of time;

the UE is informed of said MCS employed by PMCH borne by said MBSFN subframes in said period of time, and according to said MCS, implements decoding processing for received data of the PMCH borne by said MBSFN subframes.

Furthermore, the above resource allocation method also includes the following characteristics:

said network side device informs the UE of the MCS employed by PMCH borne by one or more MBSFN subframes in a period of time by a signaling message;

said signaling message is a system message, MCCH message, scheduling information, physical channel signaling borne by MBSFN subframe or MAC control element.

Furthermore, the above resource allocation method also includes the following characteristics:

the network side device informing UE of the employed MCS specifically refers to one of the following ways:

said network side device informs UE of specific modulation and coding information; or said network side device informs UE of an index of one MCS list, and also informs UE of said MCS list, and said MCS list contains one or more MCS configurations, and said MCS configurations are specific MCS configuration contents or point to one of a group of MCS configuration information predefined by protocol; or said network side device informs UE of one MCS configuration identification in one MCS list, and also informs UE of said MCS list, and said MCS list contains one or more MCS configurations, and each MCS configuration corresponds to one configuration identification, and said MCS configurations are specific MCS configuration contents or refer to one of a group of MCS configuration information predefined by protocol; or said network side device informs UE of an index of one MCS list predefined by protocol; or if the network side device doesn't indicate the MCS employed by UE, said MCS is default configuration, and the UE is informed of said default configuration information by system messages or MCCH messages.

Furthermore, the above resource allocation method also includes the following characteristics:

said network side device indicates all employed MCSs in said one period of time by system messages or MCCH messages;

if said UE doesn't receive said signaling message properly, according to the received all employed MCSs, implement decoding processing for said MBSFN subframes by way of an attempt on blind detection.

In order to solve the above technical problem, the invention provides a resource allocation method for dynamic multiplexing of Multimedia Broadcast Multicast Service, which comprises:

a network side device configuring a Modulation and Coding Scheme (MCS) respectively for one or more logical channels, implementing modulation and coding processing for data of Physical Multicast Channel (PMCH) borne by MBSFN subframes bearing said logical channels according to said MCS.

Furthermore, the above resource allocation method also includes the following characteristics:

said network side device configures MCS for said logical channels, employing one of the following ways specifically:

the network side device configures MCS respectively for one or more logical channels sent in MBSFN subframe allocation pattern (MSAP) occasion; or the network side device sorts one or more logical channels sent in the MSAP occasion, configuring the MCS for each category of logical channels respectively; or the network side device segments one or more logical channels sent in the MSAP occasion, configuring the MCS for each segment of logical channel respectively; each segment of logical channel contains one or more logical channels configured continuously in a signaling message.

Furthermore, the above resource allocation method also includes the following characteristics:

said network side device configures logical channel data with same Quality of Service (QoS) requirement to be sent continuously when performing service scheduling.

Furthermore, the above resource allocation method also includes the following characteristics:

after configuring MCS, said network side device informs UE of MCS corresponding to one or more logical channels in one period of time, and informs UE of MBSFN subframe position information to which one or more logical channels are mapped in said period of time, and the UE is informed of MCS employed by MBSFN subframes where said logical channels are located in said period of time by said MBSFN subframe position information, and according to said MCS, implements decoding processing for data of PMCH borne by said MBSFN subframes.

Furthermore, the above resource allocation method also includes the following characteristics:

said network side device informs UE of the MCS corresponding to one or more logical channels in one period of time by a signaling message;

said signaling message is a system message, MCCH message, or scheduling information.

Furthermore, the above resource allocation method also includes the following characteristics:

said network side device informs UE of the employed MCS, which refers to one of the following ways specifically:

said network side device informs UE of specific modulation and coding information; or said network side device informs UE of an index of one MCS list, and also informs UE of said MCS list, and said MCS list contains one or more MCS configurations, and said MCS configurations are specific MCS configuration contents or point to one of a group of MCS configuration information predefined by protocol; or said network side device informs UE of one MCS configuration identification in one MCS list, and also informs UE of said MCS list, and said MCS list contains one or more MCS configurations, and each MCS configuration corresponds to one configuration identification, and said MCS configurations are specific MCS configuration contents or point to one of a group of MCS configuration information predefined by protocol; or said network side device informs UE of an index of one MCS list predefined by protocol; or if the network side device doesn't indicate the MCS employed by UE, said MCS is default configuration, and the UE is informed of said default configuration information by system messages or MCCH messages.

Furthermore, the above resource allocation method also includes the following characteristics:

said network side device indicates all employed MCSs in said one period of time by system messages or MCCH messages;

if said UE doesn't receive said signaling message properly, according to the received all employed MCSs, implement decoding processing for said MBSFN subframes by way of an attempt on blind detection.

Furthermore, the above resource allocation method also includes the following characteristics:

if logical channel data configured with different MCSs are mapped to PMCH borne by a same MBSFN subframe, the network side device employs a predefined rule to choose one MCS to implement modulation and coding processing for PMCH data borne by said MBSFN subframe.

Furthermore, the above resource allocation method also includes the following characteristics:

said predefined rule is one of the following ways:

selecting a highest or lowest MCS in said different MCSs.

In order to solve the above technical problem, the present invention provides a resource allocation method for dynamic multiplexing of Multimedia Broadcast Multicast Service (MBMS), which comprises:

a network side device configuring one or more MCS employed in MSAP occasion, and indicating said MCS employed by UE in MSAP occasion and an application order of said MCS.

Furthermore, the above resource allocation method also includes the following characteristics:

said network side device indicates said MCS employed by UE in MSAP occasion and the application order of said MCS by a system message, or MCCH message, or scheduling information.

Furthermore, the above resource allocation method also includes the following characteristics:

when configuring said MCS employed in the MSAP occasion, said network side device will employ data of service with same MCS to be continuously scheduled and sent in said MSAP occasion.

Furthermore, the above resource allocation method also includes the following characteristics:

the UE selects MCS to implement a blind detection for the received MBSFN subframes in said MSAP occasion in sequence according to the application order of said MCS.

With the method provided in the present invention, the network side device can employ different modulation and coding in the physical layer according to different Quality of Service (QoS) requirements of different logical channels of MBMS services, thereby achieving the purpose of improving resource utilization efficiency and satisfying different service requirements.

PREFERRED EMBODIMENTS OF THE PRESENT INVENTION

Figure 1:
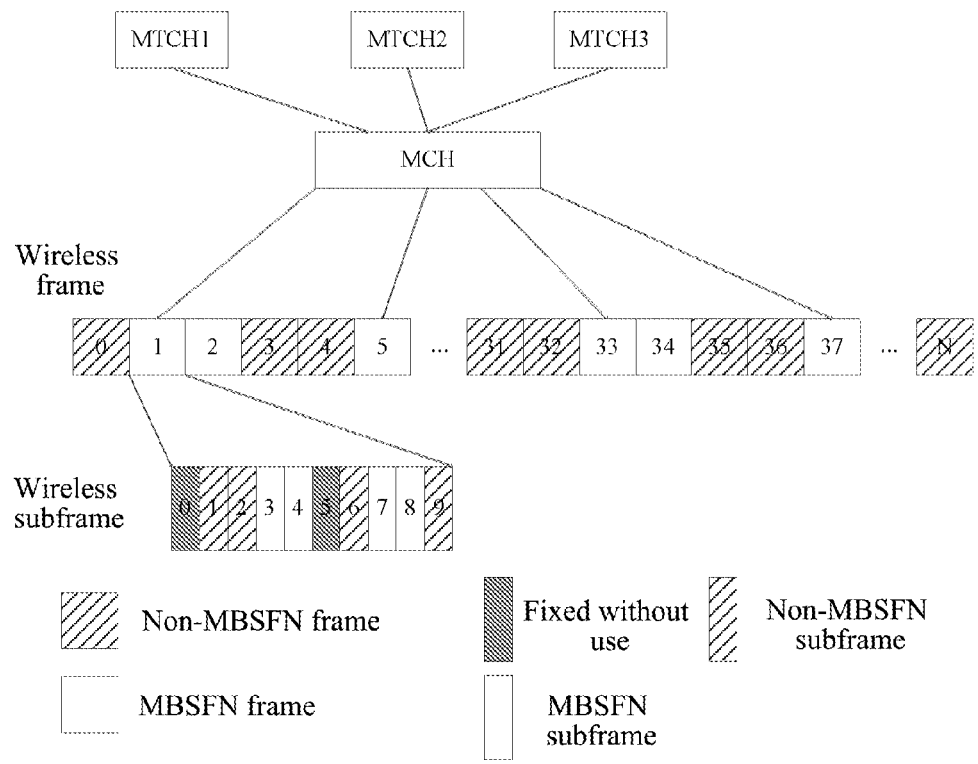
FIG. 1 is a schematic diagram of multicast resource allocated on the MSAP occasion of one MCH in the related art.
Figure 2:
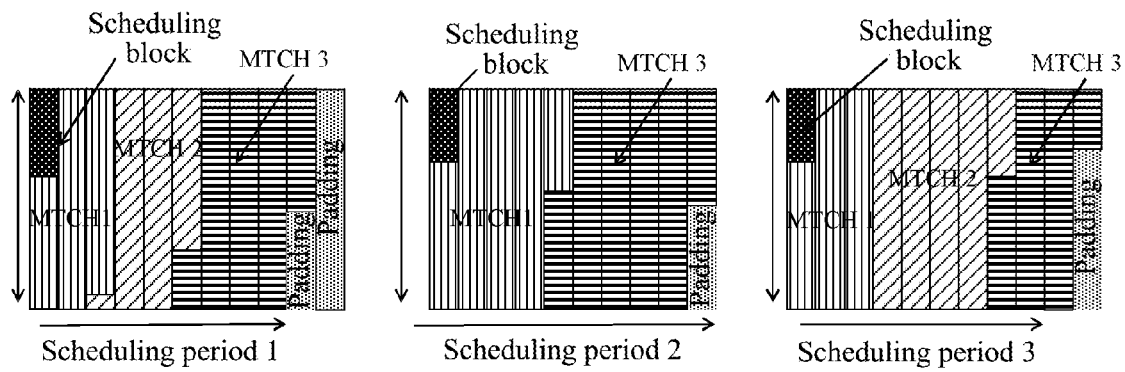
FIG. 2 is a schematic diagram of indicating a plurality of MTCH multicast resources and the scheduling block.

In the present invention, the network side device (for example the base station) configures MCS for said logical channels or the MBSFN subframes bearing said logical channels according to the transmission requirements of logical channels, and implements modulation and coding processing for the data (i.e. the MCH transmission block) of PMCH borne by MBSFN subframes that bear said logical channels by said MCS.

Specifically, said network side device configuring MCS for said MBSFN subframes can employ one of the following ways:

(1) the network side device configures MCS for one or more said MBSFN subframes in the MSAP occasion respectively;

(2) the network side device performs segmenting for one or more said MBSFN subframes in the MSAP occasion respectively, wherein each segment contains one or more MBSFN subframes; the network side device configures MCS for each segment of MBSFN subframe respectively;

(3) the network side device configures MCS respectively for the MBSFN subframe corresponding to each of MSAP configurations which constitute a MSAP occasion.

Said network side device configuring MCS for said logical channels can employ one of the following ways:

(1) the network side device configures MCS for one or more logical channels sent in the MSAP occasion respectively;

(2) the network side device performs sorting for one or more logical channels sent in the MSAP occasion, and configures MCS for each category of logical channels respectively;

(3) the network side device performs segmenting for one or more logical channels sent in the MSAP occasion, and configures MCS for each segment of logical channel respectively; each segment of logical channel contains one or more logical channels configured continuously in a signaling message.

The present invention is described in detail in combination with figures and specific embodiments.

Embodiment One

In the embodiment, the network side device configures different MCSs for MBSFN subframe according to the requirements of logical channels borne by different MBSFN subframes, thereby making PMCH borne by MBSFN subframes employ different MCSs, that is performing processing with different MCSs for the MCH transmission block borne by MBSFN subframe. The MCH transmission block borne by each MBSFN subframe corresponds to one MCS configuration, and the MCH transmission block borne by different MBSFN subframes can employ different MCSs.

The network side device informs UE of MCS employed by PMCH which is borne by one or more MBSFN subframes in one period of time by the signaling message one. UE obtains MCS employed by PMCH which is borne by said MBSFN subframes in said period of time according to said signaling message, and performs decoding processing for data of PMCH borne by said MBSFN subframes according to said MCS.

Preferably, the network side device can inform UE of the MCS of PMCH borne by MBSFN subframes in said one period of time by but not limited to the following ways:

the network side device configures MCS information respectively for PMCH borne by said one or more MBSFN subframes;

the network side device performs segmenting for said one or more MBSFN subframes, wherein each segment contains one or more continuous MBSFN subframes, and the network side device configures MCS information for PMCH borne by each segment of MBSFN subframe respectively;

the network side device configures MCS for said one or more MBSFN subframes according to the MSAP allocation period, when a MCH channel is composed of multiple MSAP configurations, configure MCS information for PMCH borne by MBSFN subframes corresponding to one or more MSAP configurations respectively.

Preferably, said MCS information is but not limited to one of the followings:

(1) specific modulation and coding information; or (2) an index of one MCS list, at this time the network side device informs UE of said MCS list by signaling message two, and the list contains one or more MCS configurations which can be specific MCS configuration contents and also can point to one of a group of MCS configuration information predefined by protocol; or (3) one MCS configuration identification in one MCS list, at this time the network side device informs UE of said MCS list by signaling message two, and the list contains one or more MCS configuration, and each MCS configuration corresponds to one configuration identification, and the MCS configuration can be specific MCS configuration contents and also can point to one of a group of MCS configuration information predefined by protocol; or (4) one index of MCS configuration, the index points to a group of MCS configuration information predefined by protocol; or (5) default MCS configuration, the network side device specifies a kind of default MCS configuration by signaling message three or protocol, and if the network side device does not configure MCS information for some MBSFN subframes, the transmission blocks borne by these MBSFN subframes employ said default MCS configuration, and the MCS configuration can be specific MCS configuration content and also can refer to one of a group of MCS configuration information predefined by protocol.

Said signaling message one, signaling message two and signaling message three are but not limited to system messages, MCCH messages or scheduling information or MAC control element bearing scheduling information, or other messages or MAC control element which the network side device sends to UE, or physical channel signaling borne by MBSFN subframes.

Said MBSFN subframes in a period of time refer to the MBSFN subframes in one scheduling period of MCH channel, or MBSFN subframes contained in the period of MSAP occasion, or MBSFN subframes sent in one sending period of logical channel.

Figure 3:
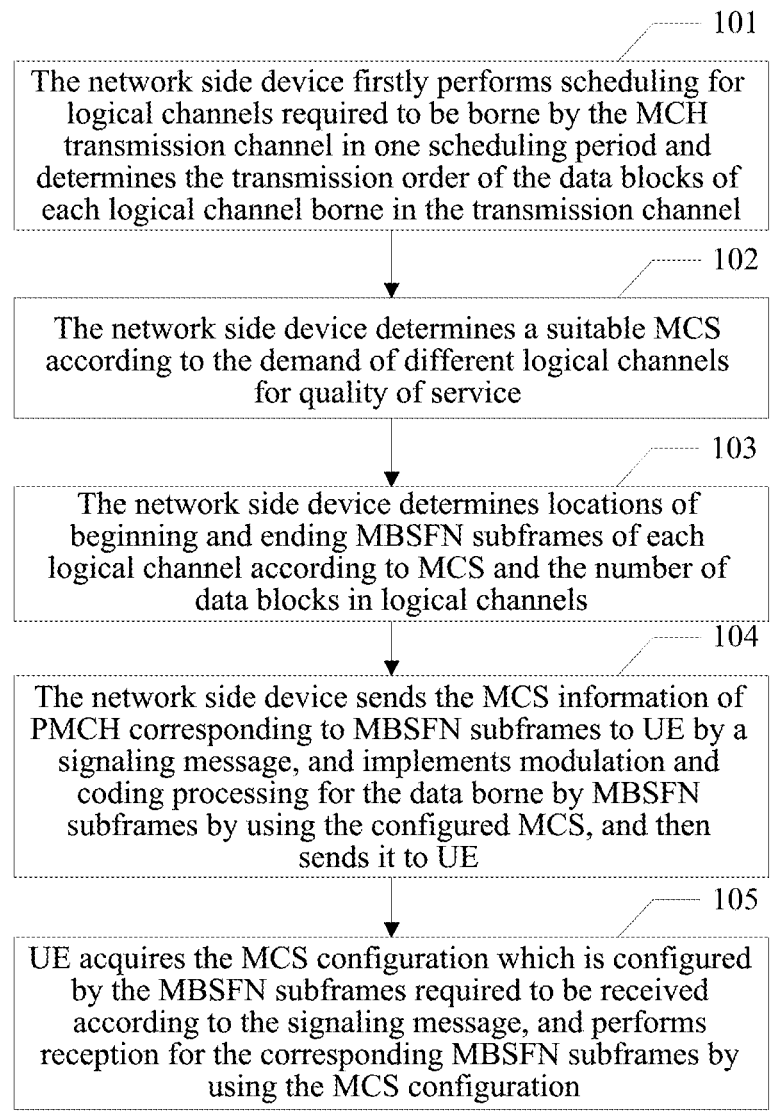
FIG. 3 is a flow chart of a resource allocation method for dynamic multiplexing of MBMS in the embodiment one of the present invention.

FIG. 3 is an application example flowchart of employing a resource allocation method for dynamic multiplexing of multimedia broadcast multicast service in the present invention, which is as a preferable scheme of the implementation method.

Step 101: the network side device firstly performs scheduling for the logical channels required to be borne by MCH transmission channels in one scheduling period, and determines the transmission order of the data block of each logical channel which is borne in the transmission channel. Preferably, when performing service scheduling, the network side device schedules the logical channel data with the same requirement of quality of service to continuous MBSFN subframes for transmission.

Step 102: the network side device determines the suitable MCS according to the demand of different logical channels for quality of service.

Step 103: the network side device determines the locations of beginning and ending MBSFN subframes of each logical channel according to MCS and the number of the logical channel data block. Specifically, the network side device can know the size of the data transmitted by MBSFN subframes which use the MCS according to MCS, then can know definitely the number of MBSFN subframes which transmitting the data of each logical channel needs to occupy according to the sending order of logical channels and the amount of the data of each logical channel in step 1.

Step 104: the network side device sends MCS information of the corresponding PMCH of MBSFN subframes to UE by the signaling message in this method, and sends the data to UE after performing modulation and coding processing for the data borne by said MBSFN subframes by configured MCS.

Step 105: UE obtains MCS configuration which is configured by MBSFN subframes which require to be received according to signaling messages, and performs reception for the corresponding MBSFN subframes by using the MCS configuration.

There are specific examples of several kinds of signaling configuration below, which are as preferable schemes of the embodiment:

1. The network side device indicates a MSAP occasion configuration during one scheduling period in MCCH messages or system messages, which contains one or more MSAP configurations, configuring the MCS list in the MCCH message or system message or scheduling information, and the MCH list contains one or more MCS configurations which can be specific MCS configuration contents and can also point to one of a group of MCS configuration information predefined by protocol. The network side device indicates MBSFN subframe segmentation information in the scheduling information, and each MBSFN subframe segment contains one and more continuous MBSFN subframes, and the configuration of each segment has corresponding MCS information, and the MCS information is an index which points to one specific MCS configuration in the MCS list. Preferably, the network side device configures the default MCS configuration in system messages or MCCH messages or scheduling information, and MBSFN segment without MCS information employs default MCS configuration.

2. The network side device indicates a MSAP occasion configuration during one scheduling period in MCCH messages or system messages, which contains one or more MSAP configurations, configuring the MCS list in the MCCH message or system message or scheduling information, and the MCH list contains one or more MCS configurations which can be specific MCS configuration contents and can also point to one of a group of MCS configuration information predefined by protocol. The network side device configures MCS information corresponding to the corresponding MBSFN subframes in MCCH messages or scheduling information for one or more MSAP carried by said system message or MCCH message, and the MCS information is an index pointing to one specific MCS configuration in the MCS list. Preferably, the network side device configures the default MCS configuration in the system message or MCCH message or scheduling information, MBSFN subframes corresponding to MSAP configuration without configured MCS information use the default MCS configuration.

3. The network side device indicates a MSAP occasion configuration during one scheduling period in MCCH messages or system messages, which contains one or more MBSFN configurations, configuring the MCS list in the MCCH message or system message or scheduling information, and the MCH list contains one or more MCS configurations which can be specific MCS configuration contents and can also point to one of a group of MCS configuration information predefined by protocol. The network side device indicates the MCS information employed by one or more said MBSFN subframes in scheduling information or MCCH messages, and the MCS information is an index pointing to one specific MCS configuration in MCS list. Preferably, the network side device configures the default MCS configuration in the system message or MCCH message or scheduling information, MBSFN subframes corresponding to MSAP configuration without configured MCS information use the default MCS configuration.

4. The network side device indicates a MSAP occasion configuration during one scheduling period in MCCH messages or system messages, which contains one or more MBSFN configurations. The network side device indicates one or more MBSFN subframes, or the MCS information employed by one or more subframe segments in scheduling information or MCCH messages, and the MCS information is the index pointing to MCS configuration in one MCS configuration list predefined by protocol. Preferably, the network side device configures the default MCS configuration in system messages or MCCH messages or scheduling information, MBSFN subframes corresponding to MSAP configuration without configured MCS information use the default MCS configuration.

In said embodiment, the MCS configuration employed by said MBSFN subframes refers to the MCS employed by PMCH channel which is borne by MBSFN subframes, or the MCS employed by MCH transmission block corresponding to PMCH borne by MBSFN subframes.

Embodiment Two

In this embodiment, the network side device configures different MCSs for logical channels according to the requirements of logical channels borne by different MBSFN subframes, thereby employing different MCSs for PMCH borne by MBSFN subframes bearing logical channels, that is to say, performing processing for MCH transmission block borne by MBSFN subframes bearing logical channels by using different MCSs. Each MCH transmission block borne by MBSFN subframe corresponds to one MCS configuration, and MCH transmission blocks borne by different MBSFN subframes can employ different MCSs.

The network side device informs UE of the MCS configuration corresponding to one or more logical channels in one period of time by signaling message one, and informs UE of the MBSFN subframe position information to which one or more logical channels are mapped in said period of time, and the UE obtains MCS employed by MBSFN subframes where said logical channels are located in said period of time by said information, and according to said MCS, implements decoding processing for PMCH borne by said MBSFN subframes. In this embodiment, the network side device performs MCS configuration according to logical channels.

The difference between embodiment two and embodiment one lies in the difference of configuration methods.

Preferably, the network side device can inform UE of the MCS configuration of logical channels in said one period of time by but not limited to the following methods:

method one: the network side device configures MCS for said one or more logical channels respectively;

method two: the network side device performs classifying for said one or more logical channels, and each classification of logical channels employ one kind of MCS configuration;

method three: the network side device performs segmenting for said one or more logical channels, and each segment of logical channel is configured with MCS respectively, and each segment of logical channel contains one or more logical channels which are configured continuously in a signaling message; for instance, in the MCCH message, the configuration information of the logical channel of service is arranged in order, and for another instance, in the scheduling information, the logical channel scheduling information of service is arranged in order.

Preferably, said MCS information is but not limited to one of the followings:

(1) specific modulation and coding information.

(2) an index of one MCS list, at this time the network side device informs UE of said MCS list by signaling message two, and the list contains one or more MCS configurations which can be specific MCS configuration contents and also can point to one of a group of MCS configuration information predefined by protocol.

(3) the identification of one MCS configuration in one MCS list, at this time the network side device informs UE of said MCS list by signaling message two, and the list contains one or more MCS configuration, and each MCS configuration has one identification, and the MCS configuration can be specific MCS configuration contents and also can point to one of a group of MCS configuration information predefined by protocol.

(4) one index of MCS configuration, the index points to a group of MCS configuration information predefined by protocol.

(5) default MCS configuration, in this kind of method, the network side device specifies a kind of default MCS configuration by signaling message three or protocol, and if the network side device does not configure MCS information for some MBSFN subframes, the transmission blocks borne by these MBSFN subframes employ said default MCS configuration, and the MCS configuration can be specific MCS configuration content and also can point to one of a group of MCS configuration information predefined by protocol.

Said signaling message one, signaling message two and signaling message three are but not limited to system messages, MCCH messages or scheduling information or MAC control elements bearing scheduling information, or other messages or MAC control elements which the network side device sends to UE.

Said MBSFN subframes in a period of time refer to the MBSFN subframes in one scheduling period of MCH channel, or MBSFN subframes allocated in the period of MSAP occasion, or MBSFN subframes sent in one sending period of logical channel.

The following offers a specific application example as the preferable scheme of the embodiment.

Step 201: the network side device firstly performs scheduling for the logical channels required to be borne by MCH transmission channels in one scheduling period, and determines the transmission order of the data block of each logical channel in the transmission channel. Preferably, when performing service scheduling, the network side device sends the logical channel data with the same requirement of quality of service continuously, or preferably, the network side device schedules the sending order of these service logical channel data according to the service sending order which is indicated by superstratum network element (MCE).

Step 202: the network side device determines a suitable MCS according to the demand of different logical channels for quality of service, or choose a suitable MCS according to the indication requirement of the superstratum network element (MCE).

Step 203: the network side device informs UE of the MCS configuration employed by said one or more logical channel data by signaling messages and bears the position information of MBSFN subframes of said one and more logical channels.

step 204: the network side device performs processing with MCS of the corresponding logical channels for physical channel PMCH data to which one and more logical channels are mapped and then sends it to UE, and if one MBSFN subframe bears different logical channels of multiple MCS, the network side device performs processing for PMCH data borne by the MBSFN subframe with a highest or lowest MCS.

Step 205: UE obtains the configured MCS of logical channels required to be received and the MBSFN subframe to which the logical channel is mapped according to signaling messages, and it can obtain the MCS configuration employed by PMCH borne by each MBSFN subframe. And choose a highest or lowest MCS to perform processing for received data according to MCS of all logical channels which maps to the MBSFN subframe.

The followings are some specific examples of signaling configuration as the preferable schemes of the embodiment:

1. The network side device indicates a MSAP occasion configuration during one scheduling period in MCCH messages or system messages, configuring a MCS list in MCCH messages or system messages or scheduling information, and the MCH list contains one or more MCS configurations which can be specific MCS configuration contents and can also point to one of a group of MCS configuration information predefined by protocol. The network side device indicates MCS information of one or more logical channels in MCCH messages or scheduling information. Preferably, the network side device configures default MCS configuration in system messages or MCCH messages or scheduling information, logical channels without configured MCS information employ default MCS configuration.

2. The network side device indicates a MSAP occasion configuration during one scheduling period in MCCH messages or system messages, configuring a MCS list in MCCH messages or system messages or scheduling information, and the MCH list contains one or more MCS configurations which can be specific MCS configuration contents and can also point to one of a group of MCS configuration information predefined by protocol. The network side device performs classifying for one or more logical channels, carrying said classifying information of logical channels in MCCH messages or scheduling information. In MCCH or scheduling information, classify one or more logical channels and configure MCS information which is the index which points to one specific MCS configuration in the MCS list. Preferably, the network side device configures default MCS configuration in system messages or MCCH messages or scheduling information, the MBSFN subframes corresponding to MSAP configuration without configured MCS information employ default MCS configuration. Preferably, said logical channel configuration has a classification identification, and at the same time, the network side device sends the corresponding relation of classification identification and MCS configuration to UE.

3. The network side device indicates a MSAP occasion configuration during one scheduling period in MCCH messages or system messages, which contains one or more MBSFN configurations, configuring the MCS list in the MCCH message or system message or scheduling information, and the MCH list contains one or more MCS configurations which can be specific MCS configuration contents and can also point to one of a group of MCS configuration information predefined by protocol. The network side device performs segmenting for one or more logical channels according to an order in the signaling message configuration, carrying said logical channel segmentation information in MCCH messages or scheduling information. In MCCH or scheduling information, segment one or more logical channels and configure MCS information which is the index which points to one specific MCS configuration in the MCS list. Preferably, the network side device configures default MCS configuration in system messages or MCCH messages or scheduling information, the MBSFN subframes corresponding to MSAP configuration without configured MCS information employ default MCS configuration.

4. The network side device indicates a MSAP occasion configuration in one scheduling period in MCCH messages or system messages, which contains one or more MBSFN subframes. The network side device indicates one or more logical channels in scheduling information or MCCH messages, or one or more logical channel segments, or MCS information employed by one or more logical channel types, and the MCS information is the index which points to MCS configuration in one MCS configuration list predefined by protocol. Preferably, the network side device configures default MCS configuration in system messages or MCCH messages or scheduling information, the MBSFN subframes corresponding to MSAP configuration without configured MCS information employ default MCS configuration.

In said embodiment, MCS configuration employed by said MBSFN subframes, refers to MCS employed by PMCH channels borne by MBSFN subframes or MCS employed by the MCH transmission block corresponding to PMCH borne by MBSFN subframes.

Embodiment Three

The embodiment one and the embodiment two of the present invention provides a method of the network side device employing different MCSs for different MBSFN subframes in MSAP occasion. Wherein, UE is required to receive MSCH or scheduling information MAC control element (MAC CE) correctly, otherwise UE will not know the corresponding relation of MBSFN subframes and MCS.

The embodiment provides a method of UE receiving MBSFN subframes, and in the case that UE cannot receive said MSCH or scheduling information MAC control element correctly, UE performs processing for said MBSFN subframes by way of an attempt on blind detection.

Specifically, the network side device indicates all employed MCSs or all possible employed MCSs of MBSFN subframes in one MSAP occasion in system messages or MCCH messages. When UE doesn't know MCS employed by a certain subframe, UE performs processing for the data of PMCH borne by subframe according to all employed MCSs or all possible employed MCSs.

Since the possible employed MCS is limited in one MSAP occasion, UE employs indicated and possible MCS in MCCH or system messages to make an attempt, which will not pay a higher price.

Embodiment Four

The embodiment offers a method of configuring MCS according to the requirement of quality of service.

In the method of this embodiment, the network side device indicates one or more MCS employed by UE in one MSAP occasion or one scheduling period and the application order of said MCS in system messages or MCCH or MSCH or scheduling information MAC CE.

The network side device will employ the data of service with same MCS to perform scheduling and sending continuously in said scheduling period, thus MBSFN subframes employing same MCS shows a segment of successive MBSFN subframes.

The network side device indicates one or more MCSs employed by UE and the application order of said MCS, which can specifically use the following ways:

the network side device indicates said one or more MCSs to UE according to the application order of these MCS in said scheduling period, or perform arrangement for said these MCS information according to the application order.

UE chooses MCS to perform blind detection for MBSFN subframes in sequence according to the application order of said MCS.

The following performs specific illustration for the method offered by the embodiment:

the network side employs MCS 1 for subframes 0 to 100 in one scheduling period, employs MCS 2 for subframes 101 to 200 and employs MCS 3 for subframes 201 to 300.

The network side device indicates the MCS employed by UE in the scheduling period and the application order of these MCS, that is to say, indicates the order of MCS 1, MCS 2 and MCS 3 to UE.

Specifically, the network side device use said MCS 1, MCS 2 and MCS 3 to constitute a list, and arranges said MCS information in the list according to the order.

Or, the network side device carries employed MCS information at the same time in the service configuration information carried by MCCH message which is indicated to UE, because the sending order of service is indicated to UE by MCCH message, and the application order of MCS is the sending order of its corresponding service.

When performing MCS blind detection for MBSFN subframes, UE firstly employs the first MCS 1 to perform detecting, because the order in MCS in the list and true application order in MBSFN subframes are same, and in the scope of subframe 0 to subframe 100, UE only needs to carry out detection once to decode MBSFN subframes correctly.

While UE decodes subframe 101, UE firstly employs MCS 1, and then employs MCS 2, and at this time it needs to employ two blind detections to decode MBSFN subframe 101 correctly. In the subsequent subframe detection, UE only needs to carry out detection starting from MCS 2, thus from subframe 101 to 200, UE only needs to carry out detection once to carry out decoding correctly.

When UE decodes subframe 201, UE begins to perform blind detection from MCS 2, and then employs MCS 3 to decode subframe 201 correctly. That is to say, in the subframe 201 detection, UE employs two blind detections. Starting from 201 subframe, UE will perform blind detection starting from MCS 3. So from subframe 201 to 300, UE only needs to carry out detection once to decode MBSFN subframes correctly.

Certainly, the present invention can still have other various embodiments, and without departing from the spirit and essence of the present invention, those skilled in the art can make various corresponding variations and transformations according to the present invention, and these corresponding variations and transformations should all belong to the protection scope of the appended claims of the present invention.

What is claimed is:

1. A resource allocation method for dynamic multiplexing of Multimedia Broadcast Multicast Service, the method comprising:
    a network side device configuring a Modulation and Coding Scheme (MCS) respectively for one or more Multicast/Broadcast over Single Frequency Network (MBSFN) subframes, wherein different MCS are configured according to different transmission requirements;
    implementing modulation and coding for data of Physical Multicast Channel (PMCH) borne by said MBSFN subframe according to said MCS; wherein:
        said network side device configures the MCS for said one or more MBSFN subframes, employing the following ways;
        the network side device configuring the MCS respectively for one or more MBSFN subframes in an MBSFN subframe allocation pattern (MSAP) occasion; or
        the network side device segmenting said one or more MBSFN subframes in the MSAP occasion, wherein each segment contains one or more MBSFN subframes; and
        the network side device configuring the MCS for each segment of each MBSFN subframe respectively;
    when performing service scheduling, said network side device scheduling logical channel data with same Quality of Service (QoS) requirement to continuous MBSFN subframes;
    said network side device indicating all employed MCSs in one period of time by system messages or MCCH messages; and
    if User Equipment does not receive a signaling message properly, according to the received all employed MCSs, carrying out decoding processing for said MBSFN subframes by way of an attempt on blind detection.

2. The method according to claim 1, wherein after configuring the MCS, said network side device informs User Equipment (UE) of the MCS employed by I PMCH borne by one or more MBSFN subframes in one period of time;
    the UE is informed of said MCS employed by the PMCH borne by said MBSFN subframes in said period of time, and according to said MCS, implements decoding processing for received data of the PMCH borne by said MBSFN subframes.

3. The method according to claim 2, wherein said network side device informs the UE of the MCS employed by the PMCH borne by one or more MBSFN subframes in one period of time by a signaling message;
    said signaling message is a system message, Multicast Control Channel (MCCH) message, scheduling information, physical channel signaling borne by the MBSFN subframe or MAC control element.

4. The method according to claim 2, wherein the network side device informs the UE of the MCS employed by the PMCH borne by one or more MBSFN subframes in one period of time, specifically:
    said network side device informing the UE of specific modulation and coding information; or
    said network side device informing the UE of an index of one MCS list and also informing the UE of said MCS list, said MCS list containing one or more MCS configurations which are specific MCS configuration contents or point to one of a group of MCS configuration information predefined by protocol; or
    said network side device informing the UE of one MCS configuration identification in one MCS list and also informing the UE of said MCS list, said MCS list containing one or more MCS configurations, and each MCS configuration corresponding to one configuration identification, and said MCS configurations being specific MCS configuration contents or pointing to one of a group of MCS configuration information predefined by protocol; or said network side device informing the UE of an index of one MCS list predefined by protocol; or if the network side device does not indicate the MCS employed by the UE, said MCS being a default configuration, and the UE being informed of said default configuration information by system messages or MCCH messages.

* * * * *